May 29, 1956 — A. E. DODD — 2,748,265
ELECTRICAL RELAY OPERATING CIRCUIT FOR CONTROL
OF HIGHWAY CROSSING SIGNALS
Filed Nov. 12, 1952
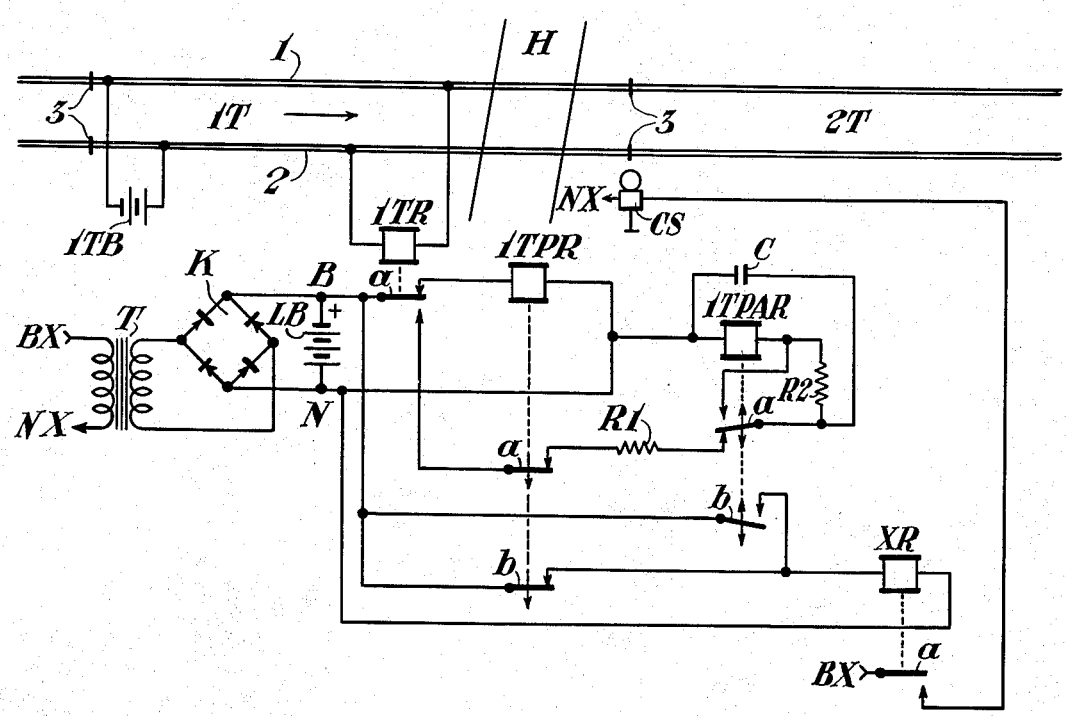
INVENTOR.
*Arthur E. Dodd*
BY W. L. Stout.
*HIS ATTORNEY*

United States Patent Office 2,748,265
Patented May 29, 1956

2,748,265

ELECTRICAL RELAY OPERATING CIRCUIT FOR CONTROL OF HIGHWAY CROSSING SIGNALS

Arthur E. Dodd, Edgewood, Pa., assignor to Westinghouse Air Brake Company, Wilmerding, Pa., a corporation of Pennsylvania Application November 12, 1952, Serial No. 319,871

6 Claims. (Cl. 246—130)

My invention relates to a time delay circuit arrangement including a capacitor snubbed time delay relay which is supplied with energy from a source subject to voltage fluctuation, and in particular to a circuit means for assuring that the time of operation of the time delay relay will remain relatively constant regardless of the voltage of the source.

In utilizing time delay relays, it is often undesirable for various reasons to have the time delay lengthened. When a capacitor snubbed time delay relay is used, one way in which this time delay could be prolonged is by charging the snubbing capacitor to a greater voltage than normal. This might occur if the battery supplying energy to the capacitor became disconnected from its charging rectifier and thereby caused the output voltage of the rectifier to rise and be applied directly across the capacitor.

One application where capacitor snubbed time delay relays are often used is in the control of highway crossing signals at a highway grade crossing. In such an application, the capacitor snubbed time delay relay is frequently energized from a storage battery which is charged by a full-wave rectifier energized from an alternating current source through a suitable step down transformer. The alternating current supply to the rectifier sometimes has poor voltage regulation and when this is the case the rectifier output voltage rises if the battery becomes disconnected from the rectifier. This rise in output voltage of the rectifier, in addition to a further rise in voltage due to the filtering action of the snubbing capacitor, causes an appreciable increase in the voltage across the snubbing capacitor and is likely to cause an increase in the time delay of the associated time delay relay.

In such an application, the control of the highway crossing signal is effected through the medium of a track circuit including the usual track relay. In the usual circuit arrangements of the type described, when a train approaching the crossing shunts this track relay, it interrupts the energizing circuit to the capacitor snubbed time delay relay between the operating battery and the relay. The time delay is so set that under normal conditions the time delay relay will actuate the highway crossing signal in a minimum safe time after the train shunts the track circuit if the train is moving at maximum authorized speed. If the snubbing capacitor is over-charged due, for example, to a battery disconnection, the time delay will be lengthened and the warning time may be less than the safe minimum. Such a condition is undesirable and should be avoided.

An object of my invention is to provide a circuit arrangement for preventing an increase of the time delay of a capacitor snubbed time delay relay in the event that the terminal voltage of the source of energy should rise.

Another object of my invention is to provide a circuit arrangement including a capacitor snubbed time delay relay in which the time of operation of the time delay relay will be relatively constant throughout a wide range voltage of the energizing source.

Still another object of my invention is to provide a novel circuit arrangement for actuating a highway crossing signal including a time delay relay in which the operation of the crossing signal will commence at approximately the same time after a train enters the section including the crossing signal regardless of the voltage of the source of energy.

According to my invention, I provide a normally de-energized capacitor snubbed relay which controls a control relay which in turn governs the operation of a crossing signal. The capacitor snubbed relay becomes energized upon a train entering the section including a highway crossing by a circuit including a back contact of the capacitor snubbed relay. The capacitor snubbed relay will not pick up immediately due to the presence of the capacitor across its winding. However, when the voltage across the capacitor reaches the pick up voltage of the capacitor snubbed relay, that relay will pick up and open its energizing circuit and the charging circuit for the capacitor. The capacitor snubbed relay will not thereafter immediately release but will remain picked up until the capacitor discharges to the point where the voltage across the capacitor is equal to the release voltage of the capacitor snubbed relay. Upon the release of the capacitor snubbed relay the control relay will operate and therefore actuate the crossing signal.

It should be clear that regardless of the voltage of the source of energy, the capacitor will only charge up to the voltage sufficient to pick up the capacitor snubbed relay. Since the time for charging the capacitor can be adjusted to be appreciably less than its discharge time, the time for the charge-discharge cycle will remain relatively constant over a wide range of voltage of the energizing source.

Other objects of my invention will appear hereinafter as the characteristic features of construction and mode of operation of my invention are described in detail.

I shall describe one form of circuit arrangement embodying my invention and shall then point out the novel features thereof in claims.

The accompanying drawing is a diagrammatic view showing a preferred arrangement of an improved electrical relay operating circuit arrangement embodying my invention employed in connection with a highway crossing signal installation to provide a relatively constant warning time regardless of the terminal voltage of the source of energy.

Referring now to the drawing, a stretch of railway track made up of rails 1 and 2 is divided into track sections 1T and 2T by insulated joints 3. Traffic normally moves over the stretch in the direction indicated by the arrow. Section 1T is intersected by a highway H at one end. Section 1T is provided with an ordinary track circuit including track battery 1TB and track relay 1TR. A crossing signal CS which may be of any type such as a flashing light or, as here shown, a bell is controlled by a control relay XR. Control relay XR is in turn controlled by a time delay relay 1TPAR and a slow release relay 1TPR. Time delay relay 1TPAR is of the capacitor snubbed type and is provided with a capacitor C across its winding. Direct current energy is supplied to the control relay and the time delay relay by a battery LB which is charged by a rectifying unit including a rectifier K and a step down transformer T which, in turn, is supplied with energy from an alternating current source having terminals BX and NX.

It is well known in the relay art that the voltage necessary to pick up a relay is greater than the voltage at which the relay once picked up, will remain picked up. As will be seen in the following description, my invention utilizes this fact in that the snubbing capacitor C will be charged only up to the pick up voltage of relay 1TPAR, and relay 1TPAR will not then release until capacitor C has discharged to the release voltage of relay 1TPAR.

The circuit as shown in the drawing is in its normal condition. Track relay 1TR is energized by the track battery 1TB over the conventional track circuit. Accordingly, relay 1TPR will be energized by a circuit which may be traced from the positive terminal B of the battery LB, over front contact a of relay 1TR, and the winding of relay 1TPR to the negative terminal N of the battery LB. Time delay relay 1TPAR is ordinarily deenergized due to the fact that its energizing circuit, which will subsequently be traced, is open at back contact a of relay 1TR. Control relay XR is energized and picked up by its first energizing circuit which may be traced from the positive terminal B of the battery LB, over front contact b of relay 1TPR, and the winding of relay XR to the negative terminal N of the battery LB. With relay XR picked up the energizing circuit for crossing signal CS, which includes back contact a of relay XR, is open at back contact a of relay XR and the crossing signal, therefore, is deenergized.

Having thus described my circuit arrangement in its normal condition, let it now be assumed that a train traveling from left to right enters section 1T at the left end. As the train enters section 1T, the wheels and axles of the train will shunt track relay 1TR causing it to release. Accordingly, the energizing circuit for relay 1TPR will become open at front contact a of relay 1TR, but relay 1TPR will not immediately release due to its slow release characteristic. Upon the release of relay 1TR, an energizing circuit for relay 1TPAR will become closed but relay 1TPAR will not immediately pick up due to the fact that uncharged capacitor C is across its winding. This energizing circuit for relay 1TPAR may be traced from the positive terminal B of the battery LB, over back contact a of relay 1TR, front contact a of relay 1TPR, resistor R1, back contact a of relay 1TPAR, resistor R2, and the winding of relay 1TPAR to the negative terminal N of the battery LB. It should be clear that relay 1TPAR cannot pick up until the voltage across the capacitor C has achieved a value sufficient to cause enough current to flow through the winding of relay 1TPAR to have that relay pick up. Capacitor C will, upon the release of relay 1TR, become charged by a circuit which may be traced from the positive terminal B of the battery LB, over back contact a of relay 1TR, front contact a of relay 1TPR, resistor R1, back contact a of relay 1TPAR, and the capacitor C to the negative terminal N of the battery LB. The resistor R1 is included in this charging circuit to retard the rise in voltage across capacitor C and relay 1TPAR so that the current flowing through the winding of relay 1TPAR can follow the voltage and to limit the initial flow of current through the capacitor C to a value sufficiently low as not to injure the contacts in the circuit. Although its presence is beneficial, it is not necessary to my invention. As the voltage across the capacitor C rises, the voltage across the winding of relay 1TPAR will also rise until finally, the voltage across the capacitor C will equal the pick up voltage of relay 1TPAR and it will accordingly pick up. Although the time required for the voltage across capacitor C to rise to the pick up voltage of relay 1TPAR will vary with the terminal voltage of the source of energy, it will be seen that the pick up time is relatively short as compared with the release time of relay 1TPAR. Therefore, the fluctuation in the pick up time will have little effect on the total time delay provided by relay 1TPAR.

Upon relay 1TPAR picking up a second energizing circuit for control relay XR will become established, and this circuit may be traced from the positive terminal B of the battery LB, over front contact b of relay 1TPAR, and the winding of relay XR to the negative terminal N of the battery LB. Relay 1TPR is so adjusted that it will not release until after relay 1TPAR has picked up and therefore relay XR will remain continuously energized throughout this period of time. Upon the release of relay 1TPR, the first energizing circuit for control relay XR will become open at front contact b of relay 1TPR and the energizing circuit for relay 1TPAR and the charging circuit for capacitor C will become open at front contact a of relay 1TPR. However, these last two circuits have already become open due to the picking up of relay 1TPAR.

Upon the picking up of relay 1TPAR, its energizing circuit, as already stated, becomes open and relay 1TPAR would release were it not for the presence of the capacitor C across its winding. As shown in the figure, upon relay 1TPAR picking up, resistor R2 is short circuited and a snubbing circuit through which capacitor C may discharge is established. This snubbing circuit may be traced from the capacitor C, over front contact a of relay 1TPAR, the winding of relay 1TPAR and back to the capacitor C.

Resistor R2, which is included in the energizing circuit for the relay 1TPAR, is not essential to the operation of my circuit arrangement. However, the inclusion of resistor R2 does tend to give a longer release time for 1TPAR since the voltage across the capacitor will then have to be greater than the pick up voltage of relay 1TPAR. By adjusting the valve of resistor R2 or by completely eliminating it, variation in the release time of relay 1TPAR can be secured.

Upon capacitor C discharging sufficiently for relay 1TPAR to release, relay 1TPAR will release, thereby opening the second energizing circuit for control relay XR at front contact b of relay 1TPAR and thus deenergizing control relay XR. Upon the release of control relay XR, the energizing circuit for the crossing signal CS which may be traced from terminal BX of the alternating current source, over back contact a of relay XR, and the crossing signal CS to the other terminal NX of the alternating current source, will become closed and the crossing signal CS will commence to operate. After the crossing signal once commences to operate, it will continue to operate as long as the train occupies section 1T. Upon the train vacating section 1T track relay 1TR will pick up, thereby reenergizing slow release relay 1TPR and reestablishing the first traced energizing circuit for the control relay XR. Accordingly, relay XR will pick up and open the energizing circuit for the crossing signal CS and therefore cause signal CS to cease operating. In this manner the circuit arrangement will return to its normal condition.

It should be clear from the foregoing description that the charge on the capacitor C is totally independent of the voltage of the terminal voltage across the battery LB and is dependent only upon the pick up voltage of the capacitor snubbed relay 1TPAR. Accordingly, the charge on the capacitor will be the same for each operation and, since the time it will take the capacitor to discharge to the release voltage of relay 1TPAR is dependent solely on the charge on the capacitor, the discharge time will be the same for each operation. If the values of the capacitance of capacitor C and the resistance of relay 1TPAR are properly selected, the discharge time for the capacitor will be appreciably longer than its charging time. Therefore, the entire time delay provided by relay 1TPAR, which is made up of the periods of time for charging and discharging, will be substantially independent of the terminal voltage of the source, the fluctuations in the charging time being relatively insignificant.

Although I have described my improved electrical relay operating circuit arrangement in conjunction with a railway-highway grade crossing protection apparatus, my invention is not limited to such a use and it should be clear that my circuit arrangement may be used satisfactorily in many applications in which capacitor snubbed time delay relays are to be employed.

Although I have herein shown and described only one form of my improved electrical relay operating circuit, it is to be understood that various changes and modifications may be made therein within the scope of the appended claims without departing from the spirit and scope of my invention.

Having thus described my invention, what I claim is:

1. In combination with a stretch of railway track intersected by a highway, a slow releasing relay which may occupy a first and a second position, circuit means for maintaining said slow releasing relay in its first position closed when the stretch of track is unoccupied, a time delay relay, a capacitor in multiple with a winding of said time delay relay; circuit means for energizing said time delay relay and said capacitor in multiple closed when said stretch of track is occupied, said slow releasing relay is in its first position, and said time delay relay is released; and a highway crossing signal adjacent said intersection controlled jointly by said slow releasing relay and said time delay relay.

2. In combination with a stretch of railway track intersected by a highway, a highway crossing signal adjacent said intersection, a slow releasing relay which may occupy a first and a second position, circuit means for maintaining said slow releasing relay in its first position closed when the stretch of track is unoccupied, a time delay relay, a capacitor in multiple with a winding of said time delay relay; circuit means for energizing said time delay relay and said capacitor in multiple closed when said stretch of track is occupied, said slow releasing relay is in its first position, and said time delay relay is released; a control relay, a first circuit means for energizing said control relay closed when said slow releasing relay occupies its first position, a second circuit means for energizing said control relay closed when said time delay relay is picked up, and circuit means for energizing said highway crossing signal closed when said control relay is deenergized.

3. In combination with a stretch of railway track, a section of said stretch being insulated from the remaining portions of said stretch by insulated joints, said section being intersected by a highway, said section being provided with a track circuit including a track relay, highway crossing protection control apparatus comprising a highway crossing signal adjacent said intersection, a slow release relay, a circuit for energizing said slow release relay closed when said track relay is picked up, a time delay relay, a capacitor in multiple with a winding of said time delay relay; a circuit for energizing said time delay relay and said capacitor in multiple closed when said track relay is released, said slow release relay is picked up and said time delay relay is released; a control relay, a first energizing circuit for said control relay closed when said slow release relay is picked up, a second energizing circuit for said control relay closed when said time delay relay is picked up, and an energizing circuit for said highway crossing signal closed when said control relay is released.

4. In combination with a stretch of railway track, a section of said stretch being insulated from the remaining portions by insulated joints, said section being intersected by a highway, said section being provided with a track circuit including a track relay, highway crossing protection control apparatus comprising a highway crossing signal adjacent said intersection, a slow release relay, an energizing circuit for said slow release relay including a front contact of said track relay, a time delay relay, a capacitor in multiple with a winding of said time delay relay; an energizing circuit for said time delay relay and said capacitor including a back contact of said track relay, a front contact of said slow release relay and a back contact of said time delay relay; a control relay, a first energizing circuit for said control relay including a front contact of said slow release relay, a second energizing circuit for said control relay including a front contact of said time delay relay, and an energizing circuit for said highway crossing signal including a back contact of said control relay.

5. In combination, a stretch of railway track, a section of said track being insulated from the remaining portions of said stretch by insulated joints, said section being intersected by a highway, said section being provided with a track circuit including a track relay, a highway crossing signal adjacent said intersection, a slow release relay, an energizing circuit for said slow release relay including a front contact of said track relay, a time delay relay, a capacitor in multiple with a winding of said time delay relay, a resistor; an energizing circuit for said time delay relay and said capacitor including a back contact of said track relay, a front contact of said slow release relay, said resistor and a back contact of said time delay relay; a control relay, a first energizing circuit for said control relay including a front contact of said slow release relay, a second energizing circuit for said control relay including a front contact of said time delay relay, and an energizing circuit for said highway crossing signal including a back contact of said control relay.

6. In combination, a stretch of railway track, a section of said track being insulated from the remaining portions of said stretch by insulated joints, said section being intersected by a highway, said section being provided with a track circuit including a track relay, a highway crossing signal adjacent said intersection, a slow release relay, an energizing circuit for said slow release relay including a front contact of said track relay, a time delay relay, a first resistor, a second resistor, said second resistor in series with a winding of said time delay relay, said capacitor in multiple with the series combination of said time delay relay and said second resistor; an energizing circuit for said time delay relay and said capacitor including a back contact of said track relay, a front contact of said slow release relay, said first resistor and a back contact of said time delay relay; a snubbing circuit including in series said capacitor, a front contact of said time delay relay and said winding of said time delay relay, a control relay, a first energizing circuit for said control relay including a front contact of said slow release relay, a second energizing circuit for said control relay including a front contact of said time delay relay, and an energizing circuit for said highway crossing signal including a back contact of said control relay.

References Cited in the file of this patent
UNITED STATES PATENTS

| Number | Name | Date |
|---|---|---|
| 1,914,215 | Price | June 13, 1933 |
| 2,049,854 | McCann et al. | Aug. 4, 1936 |
| 2,139,117 | Gohorel | Dec. 6, 1938 |
| 2,224,395 | Kemmerer | Dec. 10, 1940 |
| 2,421,148 | Hadfield | May 27, 1947 |
| 2,461,452 | Thompson | Feb. 8, 1949 |
| 2,465,794 | Fereday | Mar. 29, 1949 |
| 2,628,306 | McMahon | Feb. 10, 1953 |